(12) United States Patent
Masuda

(10) Patent No.: US 6,374,678 B1
(45) Date of Patent: Apr. 23, 2002

(54) HERMETICALLY SEALED PRESSURE SENSOR

(75) Inventor: Takashi Masuda, Tokyo (JP)

(73) Assignee: Yamatake Corporation (JP)

( * ) Notice: Subject to any disclaimer, the term of this patent is extended or adjusted under 35 U.S.C. 154(b) by 57 days.

(21) Appl. No.: 09/629,932

(22) Filed: Aug. 1, 2000

(30) Foreign Application Priority Data

Aug. 3, 1999 (JP) .......................................... 11-220341

(51) Int. Cl.$^7$ ................................................. G01L 7/00
(52) U.S. Cl. ....................................................... 73/706
(58) Field of Search ........................... 73/706, 715, 716, 73/717, 719, 720, 721, 722, 723, 725, 726, 727, 756

(56) References Cited

U.S. PATENT DOCUMENTS 4,942,383 A * 7/1990 Lam et al. ..................... 338/42

* cited by examiner

*Primary Examiner*—William Oen
(74) *Attorney, Agent, or Firm*—Blakely Sokoloff Taylor & Zafman

(57) ABSTRACT

A pressure sensor includes a base unit, a cap-like metal container, and a flexible barrier diaphragm. A sensor chip is mounted on the base unit. The metal container is fixed to the base unit so as to seal the sensor chip. Oil is sealed in the metal container. The barrier diaphragm forms part of the metal container to transmit an external pressure by its displacement to the sensor chip through the oil. The base unit has a metal connector, a positioning glass member, an electrode pin, and a hermetic seal glass member. The positioning glass member is fitted in the metal connector and made of an insulating material. The electrode pin is supported to extend through the positioning glass member and electrically connected to the sensor chip through a bonding wire. The hermetic seal glass member is formed on the positioning glass member fitted in the metal container to hermetically seal a portion between the metal container and positioning glass member, and a portion between the electrode pin and the positioning glass member. The hermetic seal glass member is made of an insulating material which is softened at a temperature lower than that of the positioning glass member. A method of manufacturing this pressure sensor is also disclosed.

10 Claims, 11 Drawing Sheets

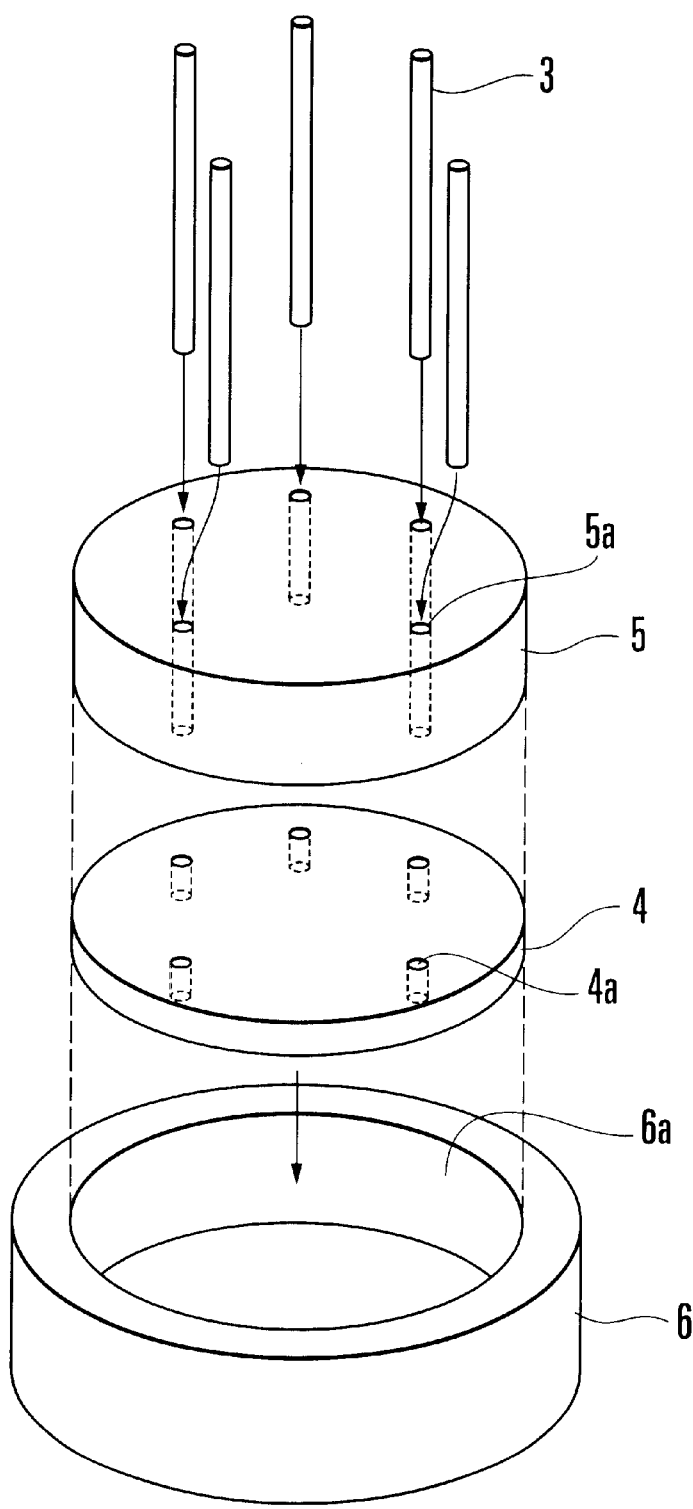
F I G. 3

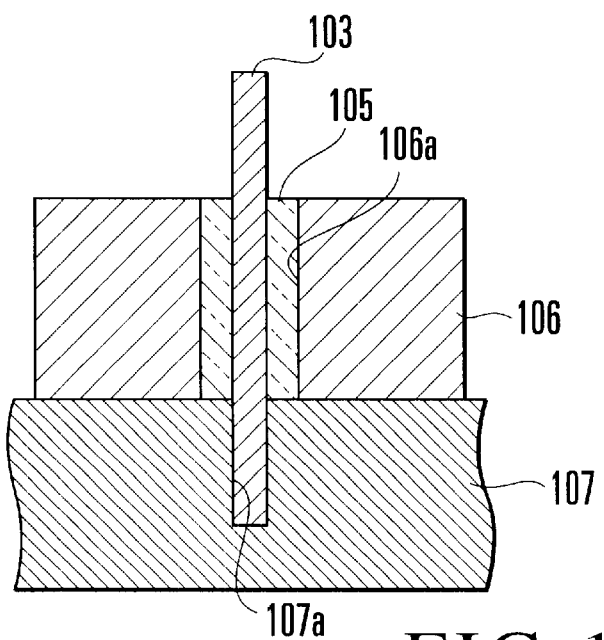
FIG. 15
PRIOR ART
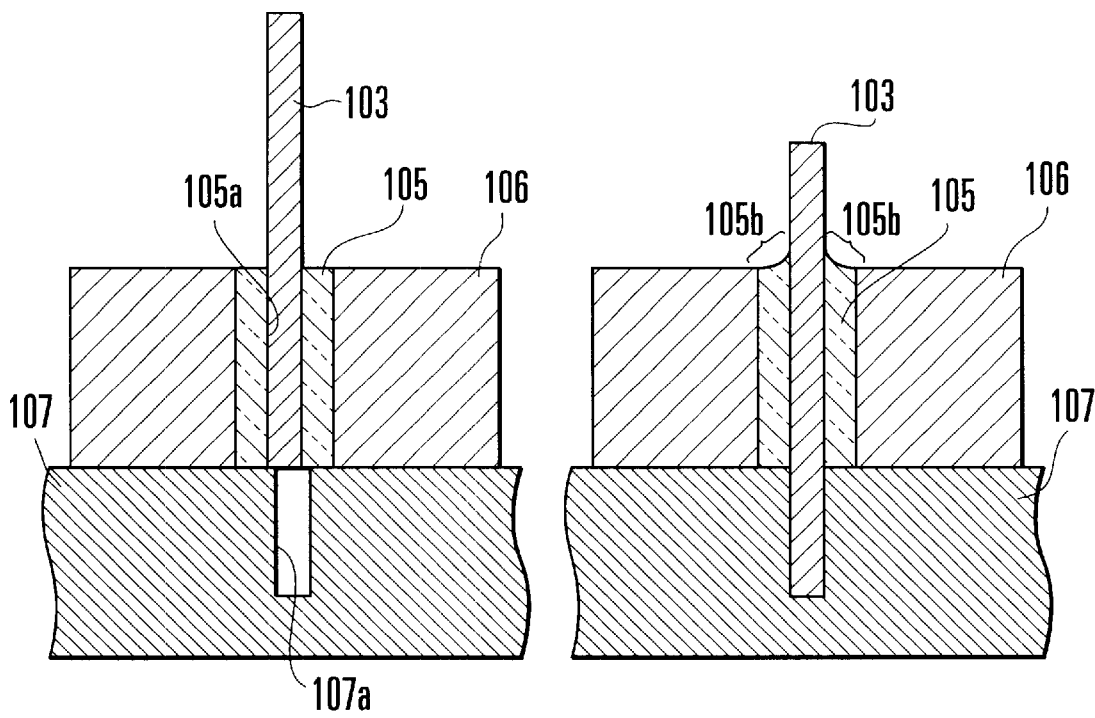
FIG. 16A
PRIOR ART
FIG. 16B
PRIOR ART

HERMETICALLY SEALED PRESSURE SENSOR

BACKGROUND OF THE INVENTION

The present invention relates to a pressure sensor and a method of manufacturing the same and, more particularly, to a pressure sensor using a piezoelectric or capacitive semiconductor sensor chip and a method of manufacturing the same.

In conventional packaging of a pressure sensor of this type, a sensor chip made of a semiconductor is generally mounted on a metal base (to be referred to as a metal stem hereinafter). In this case, a glass buffer member is conventionally formed between the metal stem and sensor chip in order to prevent the sensor chip from being broken by a stress generated during heating due to a difference in coefficient of thermal expansion between the metal stem and sensor chip.

Electrode pins for outputting electrical signals are fixed in a plurality of through holes formed in the metal stem around the sensor chip with low-melting glass to be hermetically sealed and insulated. The electrodes of the sensor chip and the electrode pins are connected to each other through bonding wires.

A conventional pressure sensor shown in FIG. 12 is constituted by a sensor chip 101, bonding wires 102, electrode pins 103, a buffer member 104, hermetic seal glass members 105, a metal stem 106, a metal container 110, and a barrier diaphragm 111. The metal container 110 and barrier diaphragm 111 are indicated by alternate long and two short dashed lines to show the internal structure of the pressure sensor.

The sensor chip 101 is a piezoelectric or capacitive pressure sensor chip made of a semiconductor such as silicon. The bonding wires 102 electrically connect the electrode pads (not shown) of the sensor chip 101 and the electrode pins 103 to each other. The electrode pins 103 are made of a conductive metal and are fixed in through holes 106a (FIG. 13) formed in the metal stem 106 to extend through them.

The buffer member 104 formed on the metal stem 106 is made of a glass material to prevent the sensor chip 101 from being broken by a difference in coefficient of thermal expansion between the sensor chip 101 and metal stem 106. The hermetic seal glass members 105 are made of a low-melting glass, and realize hermetic seal in the gaps between the inner surfaces of the through holes 106a and the electrode pins 103.

The metal stem 106 has a disk-like shape, and five through holes 106a are formed in it to correspond to the electrode pins 103. The metal container 110 has a cylindrical shape to cover the whole sensor chip 101 mounted on the metal stem 106. The interior of the metal container 110 is filled with sealed oil such as silicone oil. The barrier diaphragm 111 is comprised of a flexible metal film and deforms in accordance with an external pressure to transmit it to the sensor chip 101 through the silicone oil. When the external pressure disappears, the barrier diaphragm 111 is restored to the initial position.

As shown in FIG. 13, the buffer member 104 is formed at the central portion of the metal stem 106, and the sensor chip 101 is placed on the buffer member 104. The sensor chip 101 and electrode pins 103 are connected to each other through the bonding wires 102.

The through holes 106a formed in the metal stem 106 have diameters slightly larger than the diameters of the electrode pins 103. The hermetic seal glass members 105 are interposed in the gaps between the electrode pins 103 and the inner surfaces of the through holes 106a. The hermetic seal glass members 105 are softened once by heating, and then cooled to solidify. The gaps between the metal stem 106 and electrode pins 103 are completely hermetically sealed. Therefore, the silicone oil filled in the metal container 110 will not leak to the lower side of the metal stem 106 through the through holes 106a.

A method of manufacturing the conventional pressure sensor described above will be described with reference to FIG. 14. As shown in FIG. 14, the electrode pins 103 are inserted in holes 105a of the cylindrical hermetic seal glass members 105. The hermetic seal glass members 105 with the inserted electrode pins 103 are inserted in the through holes 106a of the metal stem 106, and the metal stem 106 is placed on a jig 107 having holes 107a. The holes 107a have diameters substantially equal to the diameters of the electrode pins 103. The electrode pins 103 projecting from the hermetic seal glass members 105 are inserted in the holes 107a.

In this manner, the metal stem 106 that supports the electrode pins 103 is placed on the jig 107, and the metal stem 106 is heated until the hermetic seal glass members 105 are softened. The metal stem 106 is then cooled to solidify the softened hermetic seal glass members 105, thereby hermetically sealing the gaps between the electrode pins 103 and through holes 106a completely. A base unit 112 is thus completed.

Meanwhile, a wafer comprised of sensor chips and a glass plate are connected to each other by anodic bonding, and the resultant structure is diced, thereby forming a plurality of sensor chips 101 with buffer members 104 bonded to their lower surfaces. The sensor chip 101 is then adhered onto the base unit 112 through the buffer member 104, and electrode pads (not shown) on the sensor chip 101 and the electrode pins 103 are connected to each other through the bonding wires 102. The whole sensor chip 101 is covered by the metal container 110 and barrier diaphragm 111, and silicone oil is injected into the metal container 110, thus completing a pressure sensor.

FIG. 15 shows a state wherein the electrode pins 103 are positioned by the jig 107. As shown in FIG. 15, since the diameters of the holes 107a of the jig 107 are substantially equal to the diameters of the electrode pins 103, the electrode pins 103 are positioned at the centers of the corresponding through holes 106a by the jig 107. Even when the hermetic seal glass members 105 are softened by heating, the positions of the electrode pins 103 will not shift.

The conventional pressure sensor described above has the following problems.

As described above, to fabricate a pressure sensor structure shown in FIG. 12, at least three bonding steps are required, i.e., the first step of hermetically sealing the metal stem and electrode pins with glass, the second step of bonding (bonding a wafer before dicing) the sensor chip and glass buffer member by anodic bonding, and the third step of adhering the glass buffer member and metal stem.

Too many steps are necessary in this manner, leading to a possible decrease in quality and increase in cost.

When a diaphragm structure using the barrier diaphragm 111 and the sealed oil is employed, since the amount of sealed oil is large, the temperature characteristics of the pressure sensor degrade. For this reason, conventionally, a structure made of glass, a ceramic material, a resin, or the like is formed around the buffer member 104 to decrease the amount of sealed oil. This, however, increases the number of steps and the number of components in turn.

In adhesion of the buffer member 104 and metal stem 106, glass sealing, and die bonding such as fixing, stress-free bonding cannot be achieved unless not only the coefficients of thermal expansion of the buffer member 104 and metal stem 106 are matched but also the coefficient of thermal expansion of the adhesive that adheres the buffer member 104 and metal stem 106 is also matched with those of the buffer member 104 and metal stem 106. In order to avoid this stress, conventionally, the thickness of the buffer member 104 is increased, so that the amount of stress propagating to the sensor chip 101 is attenuated. As the size of the buffer member 104 increases, however, the amount of sealed oil increases, and dicing of the buffer member 104 becomes difficult, which are new problems.

Although the metal stem 106 and electrode pins 103 preferably abut against each other in order to improve the pressure resistance against an external pressure, electrical insulation cannot be maintained between them since they are made of a metal. Therefore, conventionally, the thickness of the metal stem 106 is increased and the lengths of the hermetic seal glass members 105 of the metal stem 106 are increased. When, however, the through holes 106a formed in the metal stem 106 become long, they are difficult to form simultaneously by pressing, and must be formed one by one by cutting.

Due to limitations on the heat-resistant temperatures and heating temperatures of the respective steps, the temperature for the die bonding step must match the lowest temperature, and accordingly the reliability at the bonding portion decreases.

Since a decrease in insulating distance of the hermetic seal glass members 105 and a decrease in distance of wire bonding are limited, it is difficult to fabricate a multi-pin structure.

The electrode pins 103 must be accurately arranged at the central portions of the through holes 106a from the viewpoint of dielectric breakdown. For this purpose, the positioning precision of the electrode pins 103 must be high, leading to a requirement for a high size precision of the metal stem 106 and jig 107. Since the electrode pins 103 and jig 107 must be fitted with each other with a high fitting precision, a precision concerning the bend of the electrode pins 103 or the like becomes strict.

As shown in FIG. 16A, if the hole 107a of the jig 107 and the hole 105a of the hermetic seal glass member 105 shift from each other, the electrode pin 103 cannot be inserted in the hole 107a of the jig 107. For this reason, the hole 107a of the jig 107 and the hole 105a of the hermetic seal glass member 105 must be aligned with each other accurately. However, the larger the number of electrode pins 103, the more difficult alignment between the jig 107 and metal stem 106.

Due to heating, hermetic seal glass might run off, and the jig 107 and metal stem 106 may be undesirably adhered to each other.

If the high pressure resistance of the metal stem 106 is to be maintained and the shapes of the holes formed by cutting and pressing are to be maintained, the distance among the through holes 106a of the metal stem 106 cannot be decreased to be smaller than a predetermined distance, and the package cannot be downsized.

To prevent oxidation of and to remove oxide films from the surfaces of the electrode pins 103 and metal stem 106, heating may be performed in an oxygen-free atmosphere gas, e.g., a reducing atmosphere of a hydrogen-containing nitrogen or argon atmosphere (sometimes a 100%-hydrogen atmosphere). By this heating, glass hermetic sealing and brazing can be performed simultaneously. However, when an alkali metal oxide added to decrease the softening point (and the pour point) of the hermetic seal glass members 105 is reduced by hydrogen, an alkali metal is deposited to sometimes impair electric insulation and decrease the breakdown voltage, cause a stray current, or degrade and break a p-n junction.

When the hermetic seal glass member 105 runs off due to heating, it forms an unnecessary fillet shape. When a component for decreasing the amount of sealed oil is to be built in the structure, the fillet shape interferes with it to make it difficult to built the component into the structure. In order to avoid this problem, if the heating time and temperature are controlled so the hermetic seal glass member 105 will not run off, the dielectric breakdown, pressure resistance, and seal performance may undesirably degrade.

When the softened hermetic seal glass member 105 runs off, if its amount has not been precisely adjusted, the hermetic seal glass member 105 that has been squeezed out solidifies as it attaches to the electrode pin 103 or the like, this forming a fillet shape 105b. This fillet shape 105b is an obstacle when a component is to be built around the electrode pin 103.

When an unnecessary fillet shape is formed by running off of the hermetic seal glass, unless the electrode pin 103 is formed to be higher than the fillet shape, glass attaches to a bonding pad at the distal end of the electrode pin 103, thus disabling wire bonding. Therefore, the electrode pins 103 must be formed to be higher than a predetermined height, thus interfering with downsizing of the pressure sensor.

As described above, in the conventional pressure sensor, since the glass buffer member 104 and metal stem 106 are used and a jig is used for positioning the electrode pins 103, various problems arise.

SUMMARY OF THE INVENTION

It is an object of the present invention to provide a pressure sensor in which the number of bonding steps and the number of components are decreased to decrease the cost and to improve the quality, and a method of manufacturing the same.

It is another object of the present invention to provide a pressure sensor which does not require a positioning jig, and a method of manufacturing the same.

In order to achieve the above objects, according to the present invention, there is provided a pressure sensor comprising a base unit on which a sensor chip is mounted, a cap-like metal container which is fixed to the base unit so as to seal the sensor chip and in which oil is sealed, and a flexible diaphragm forming part of the metal container to transmit an external pressure by displacement thereof to the sensor chip through the oil, the base unit having a metal cylindrical member, a first positioning member fitted on an inner side of the cylindrical member and made of an insulating material, a lead member supported to extend through the first positioning member and electrically connected to the sensor chip through a bonding wire, and a hermetic seal layer formed on the first positioning member fitted in the cylindrical member to hermetically seal a portion between the cylindrical member and the first positioning member and a portion between the lead member and the first positioning member, the hermetic seal layer being made of an insulating material which is softened at a temperature lower than that of the positioning member.

BRIEF DESCRIPTION OF THE DRAWINGS

FIG. 3 is an exploded perspective view for explaining a method of manufacturing a base unit shown in FIG. 1;

FIG. 15 is a view showing how to position a base unit and determine the projecting length of the distal end portion of an electrode pin by using a jig; and FIG. 16A is a view showing a state wherein the jig and base unit shift from each other, and FIG. 16B is a view showing a state wherein a fillet shape is formed.

DESCRIPTION OF THE PREFERRED EMBODIMENTS

The present invention will be described in detail with reference to the accompanying drawings.

[First Embodiment]

Figure 1:
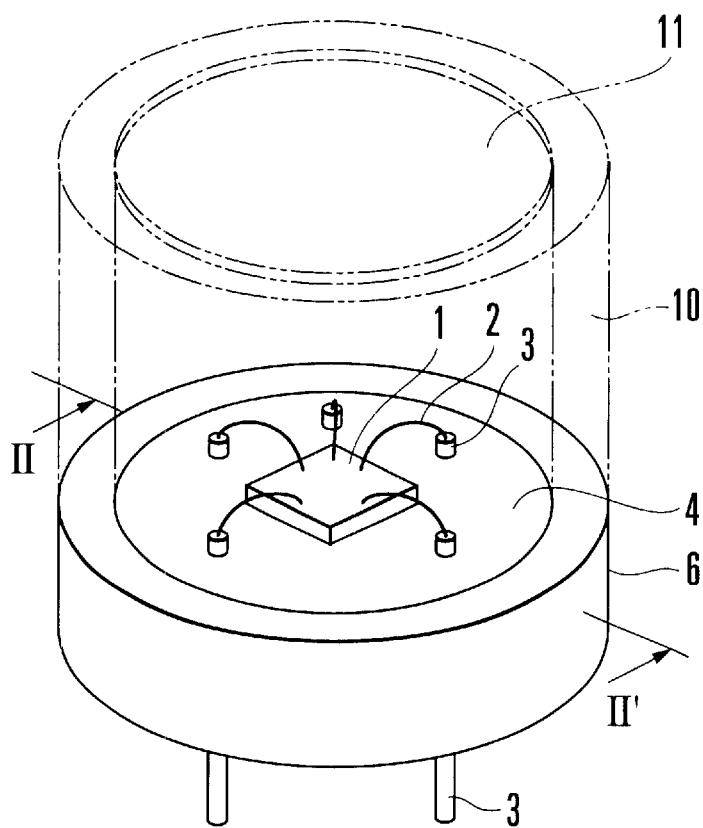
FIG. 1 is a perspective view of a pressure sensor according to the first embodiment of the present invention.

FIG. 1 shows a pressure sensor according to the first embodiment of the present invention.

As shown in FIG. 1, the pressure sensor according to this embodiment has a cylindrical metal connector 6, a disk-like positioning glass member 4 fitted in the metal connector 6, a plurality of electrode pins 3 fixed to extend through the positioning glass member 4 and made of a conductive metal, a piezoelectric or capacitive sensor chip 1 mounted at the central portion of the positioning glass member 4 and made of a semiconductor such as silicon, bonding wires 2 for electrically connecting the distal end portions of the electrode pins 3 and the electrode pads (not shown) of the sensor chip 1 to each other, a cap-like metal container 10 having an end face bonded to the metal connector 6 to seal the sensor chip 1, and a barrier diaphragm 11 formed at the ceiling of the metal container 10 and comprised of a flexible metal film.

The interior of the metal container 10 is filled with a sealed oil such as silicone oil. The barrier diaphragm 11 deforms in accordance with an external pressure to transmit it to the sensor chip 1 through the silicone oil. When the external pressure disappears, the barrier diaphragm 11 is restored to the initial position. In order to show the internal structure of the pressure sensor, the metal container 10 and barrier diaphragm 11 are indicated by long and two short dashed lines.

Figure 2:
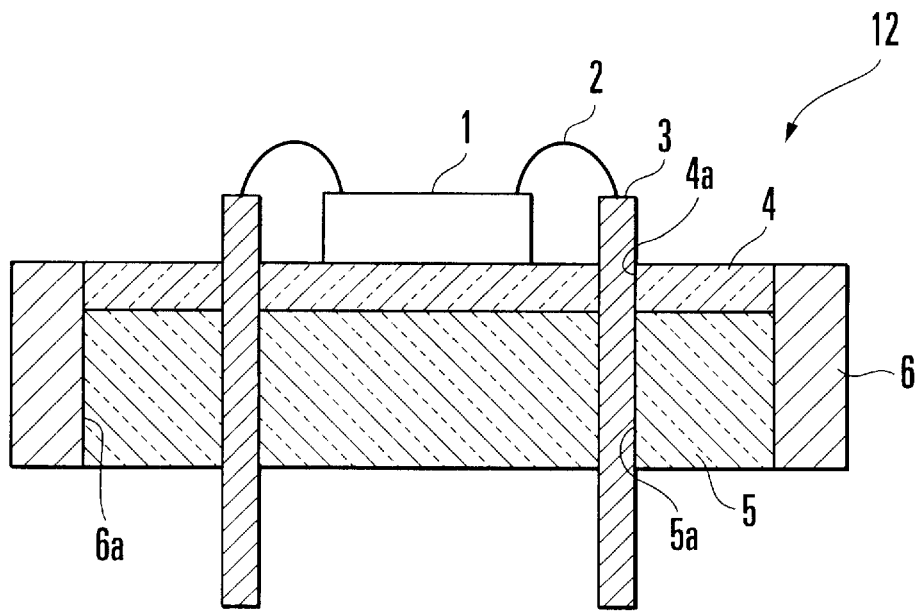
FIG. 2 is a sectional view taken along the line II–II' of FIG. 1.

As shown in FIG. 2, a disk-like hermetic seal glass member 5 made of low-melting glass such as soda-lime glass is overlaid on the lower surface of the positioning glass member 4. The overlaid positioning glass member 4 and hermetic seal glass member 5 are fitted on an inner surface 6a of the metal connector 6. The positioning glass member 4 is made of low-alkali or non-alkali glass such as silica glass, and has through holes 4a to correspond to the positions of the electrode pins 3.

Similarly, the hermetic seal glass member 5 has through holes 5a communicating with the through holes 4a to correspond to the positions of the electrode pins 3. The through holes 4a and 5a are formed in the directions of thicknesses (the direction of the central axis of the metal connector 6) of the positioning glass member 4 and hermetic seal glass member 5.

The through holes 4a and 5a of the positioning glass member 4 and hermetic seal glass member 5 have diameters almost equal to the diameters of the electrode pins 3. The small gaps between the electrode pins 3 and the inner surfaces of the corresponding through holes 4a are hermetically sealed by the hermetic seal glass member 5 which is softened (or fluidized) and solidifies. Therefore, the silicone oil filled in the metal container 10 does not leak to the lower side of the hermetic seal glass member 5 through the through holes 4a and 5a.

Although the metal container 10 and metal connector 6 are fabricated separately and bonded to each other, they may be formed to constitute an integral structure.

A method of manufacturing the pressure sensor having this arrangement will be described with reference to FIG. 3.

As shown in FIG. 3, the electrode pins 3 are inserted in the through holes 5a from the lower side of the hermetic seal glass member 5, and then in the through holes 4a of the positioning glass member 4. Subsequently, the hermetic seal glass member 5 and positioning glass member 4 are fitted on the inner surface 6a of the metal connector 6.

The metal connector 6 with the fitted hermetic seal glass member 5 and positioning glass member 4 is heated until only the hermetic seal glass member 5 is softened (or fluidized). The heated hermetic seal glass member 5 expands in accordance with its coefficient of thermal expansion and is softened, and is then fluidized as it is heated to a higher temperature. The heating temperature and time are adjusted so that the softened (or fluidized) hermetic seal glass member 5 sufficiently flows into the gaps between the electrode pins 3 and the positioning glass member 4.

The softened (or fluidized) hermetic seal glass member 5 is cooled to solidify again. By this cooling step, the thermally expanded hermetic seal glass member 5 shrinks to completely hermetically seal the gaps between the electrode pins 3 and the inner surfaces of the corresponding through holes 4a and the gap between the positioning glass member 4 and the inner surface 6a of the metal connector 6. A base unit 12 is completed in this manner.

The sensor chip 1 obtained by dicing in advance is adhered to the central portion of the positioning glass member 4 surrounded by the electrode pins 3, and the electrode pads (not shown) of the sensor chip 1 and the distal end portions of the electrode pins 3 are connected to each other with the bonding wires 2. The end face of the metal container 10 with the barrier diaphragm 11 is adhered to the metal connector 6, the whole sensor chip 1 is sealed in the metal container 10, and silicone oil is injected into the metal container 10. The pressure sensor is completed in this manner.

When fabricating the positioning glass member 4 from temporarily calcined preform glass (obtained by solidifying glass powder by using a binder such as polyvalent alcohol), if a positioning glass member 4 with a high softening (or pour) point is used, the preform glass stays in the temporarily calcined state, and the bond of the glass powder is weak, so that a high material strength cannot be obtained. Therefore, the softening (or pour) points of the hermetic seal glass member 5 and positioning glass member 4 must be determined and the operation temperature and time must be set, such that the positioning glass member 4 is softened (or fluidized) to such a degree that it will not adversely influence positioning (the positions of the electrode pins 3 will not be displaced in the radial direction).

Usually, if the difference between the softening (or pour) points of the hermetic seal glass member 5 and positioning glass member 4 is 100° C. or more, good workability can be obtained. As another method, if the positioning glass member 4 is fabricated from regular calcined forming glass, the above problem will not occur.

Figure 4:
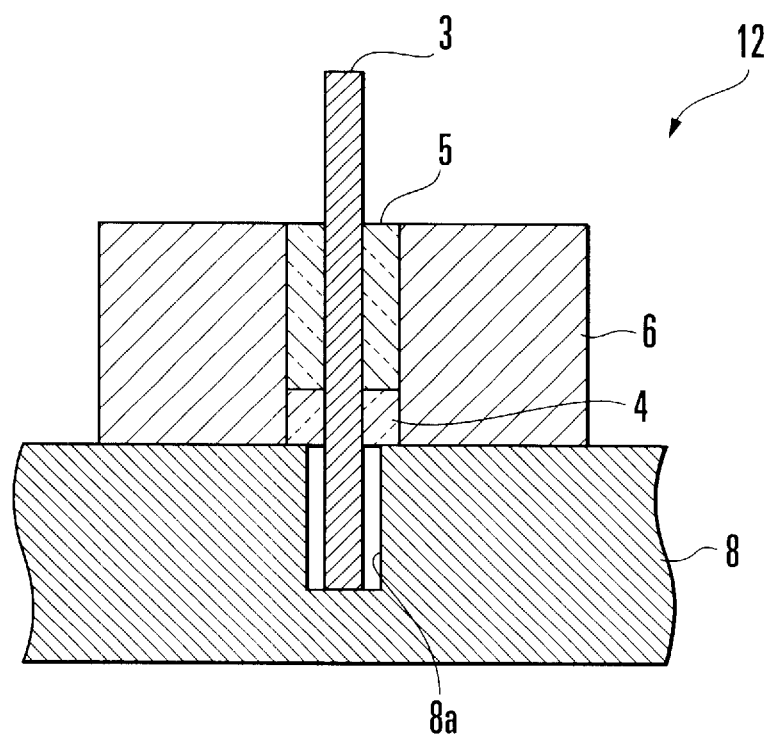
FIG. 4 is a view showing how to hermetically seal electrode pins shown in FIG. 1.

FIG. 4 shows how to hermetically seal the electrode pins 3 positioned by the positioning glass member 4.

As shown in FIG. 4, the base unit 12, with the electrode pins 3 positioned by the positioning glass member 4 in the radial and axial directions, is placed on a jig 8, and is heated to hermetically seal the electrode pins 3. Since the electrode pins 3 are positioned in advance, the diameters of holes 8a formed in the jig 8 can be larger than those of the electrode pins 3. The hole 8a need not be blind holes but can be through holes.

When the positioning glass member 4 is formed in this manner, a positioning jig need not be used, and the metal connector 6 can be prevented from being adhered to the jig 8 with the hermetic seal glass member 5 that has started leaking.

According to the above embodiment, the bonding step required for fabricating the pressure sensor includes step 1: hermetically sealing the metal connector 6 and electrode pins 3 with glass and bonding the hermetic seal glass member 5 and positioning glass member 4 simultaneously, and step 2: bonding the sensor chip 1 (bonding the diced chip) and positioning glass member 4 by anodic bondings.

The number of steps can be reduced when compared to the prior art.

In this embodiment, since the positioning glass member 4 prevents the fluidized hermetic seal glass member 5 from squeezing out, formation of unnecessary fillet shapes around the electrode pins 3 can be prevented. Accordingly, a high size precision is not required for matching between the volume of the preform glass of the hermetic seal glass member 5 and those of the gaps between the metal connector 6 and electrode pins 3. The surface where the sensor chip 1 is to be mounted can be formed flat, so other components will not hit it during build-in operation, and the heights of the electrode pins 3 can be decreased.

Since low-alkali or non-alkali glass is used to form the positioning glass member 4, the alkali component in the hermetic seal glass member 5 will not adversely affect the operation of the IC circuits or decrease the breakdown voltage.

[Second Embodiment]

In the first embodiment, although the positioning glass member 4 can prevent formation of a fillet shape on the surface where the sensor chip 1 is mounted, it cannot prevent formation of a fillet shape on the surface where the sensor chip 1 is not mounted, i.e., on the lower side of the pressure sensor. When the pressure sensor is to be built in an external unit, the fillet shape on its lower side sometimes becomes an obstacle. In the second embodiment, two positioning glass members are used to solve this problem.

Figure 5:
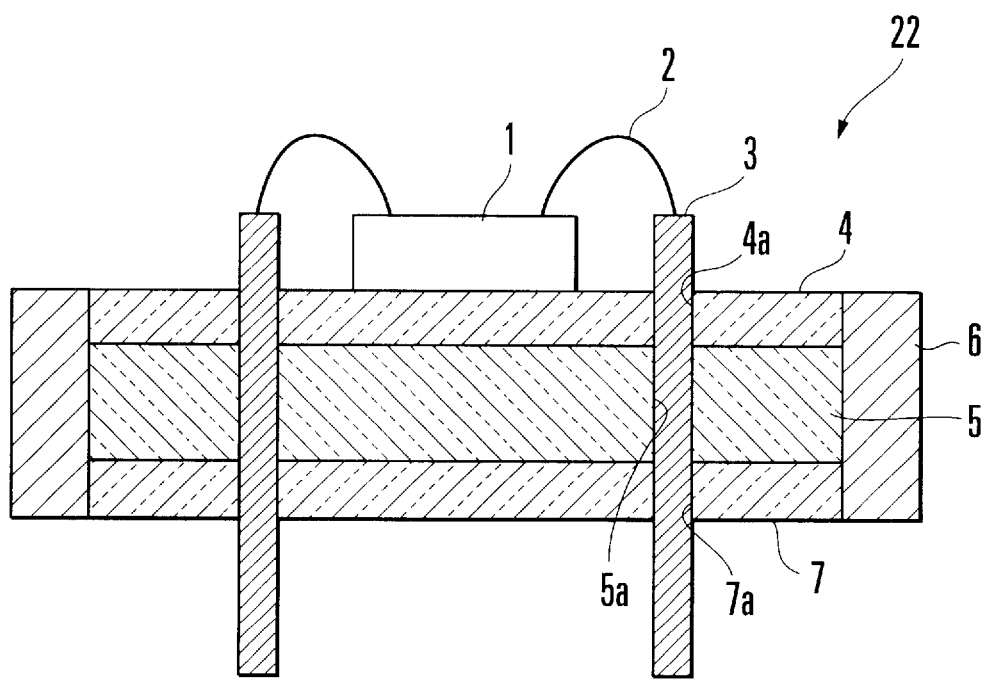
FIG. 5 is a sectional view of the base unit of a pressure sensor according to the second embodiment of the present invention.

FIG. 5 shows a pressure sensor according to the second embodiment of the present invention. Referring to FIG. 5, portions that are identical to those of FIG. 1 are denoted by the same reference numerals as in FIG. 1, and a detailed description thereof will be omitted.

In the second embodiment, a disk-like positioning glass member 7 is further overlaid on the lower surface of a hermetic seal glass member 5. More specifically, the hermetic seal glass member 5 is fitted on the inner side of a metal connector 6 while it is sandwiched by a positioning glass member 4 and the positioning glass member 7. The positioning glass member 7 is made of low-alkali or non-alkali glass such as silica glass, in the same manner as the positioning glass member 4.

Through holes 4a, 5a, and 7a of the positioning glass members 4 and 7 and hermetic seal glass member 5 are formed to have diameters almost equal to the diameters of electrode pins 3. The gaps between the electrode pins 3 and the inner surfaces of the corresponding through holes 4a and 7a are hermetically sealed by the hermetic seal glass member 5 which is softened (or fluidized) and solidifies. Therefore, silicone oil filled in a metal container 10 does not leak to the two sides of a base unit 22 through the through holes 4a and 5a.

Figure 6:
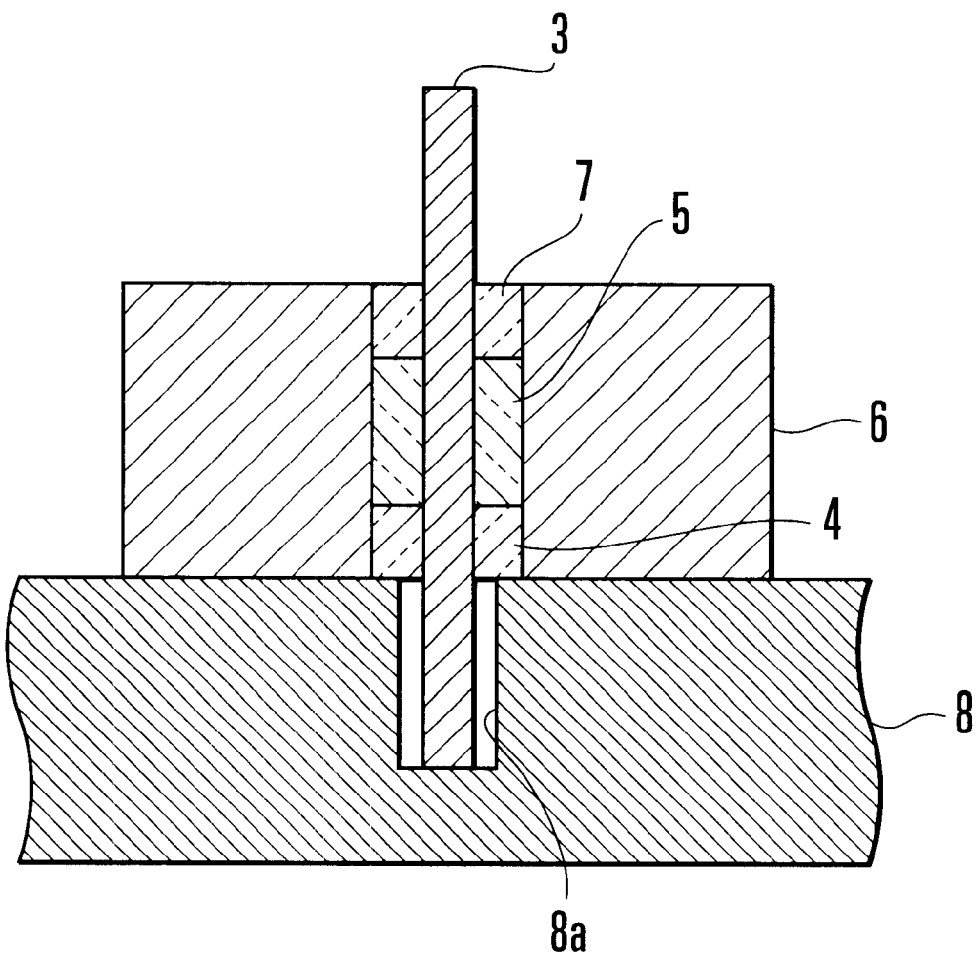
FIG. 6 is a view showing how to hermetically seal electrode pins shown in FIG. 5.

FIG. 6 shows how to hermetically seal the electrode pins 3 positioned by the positioning glass members 4 and 7.

As shown in FIG. 6, the electrode pins 3 are positioned in the radial and axial directions by the positioning glass members 4 and 7, in the same manner as in FIG. 4. Accordingly, when the electrode pins 3 are heated for hermetic sealing, they need not be positioned by a jig 8. The diameters of holes 8a formed in the jig 8 can be larger than those of the electrode pins 3.

A method of manufacturing the pressure sensor having this arrangement will be described with reference to FIG. 7.

Figure 7:
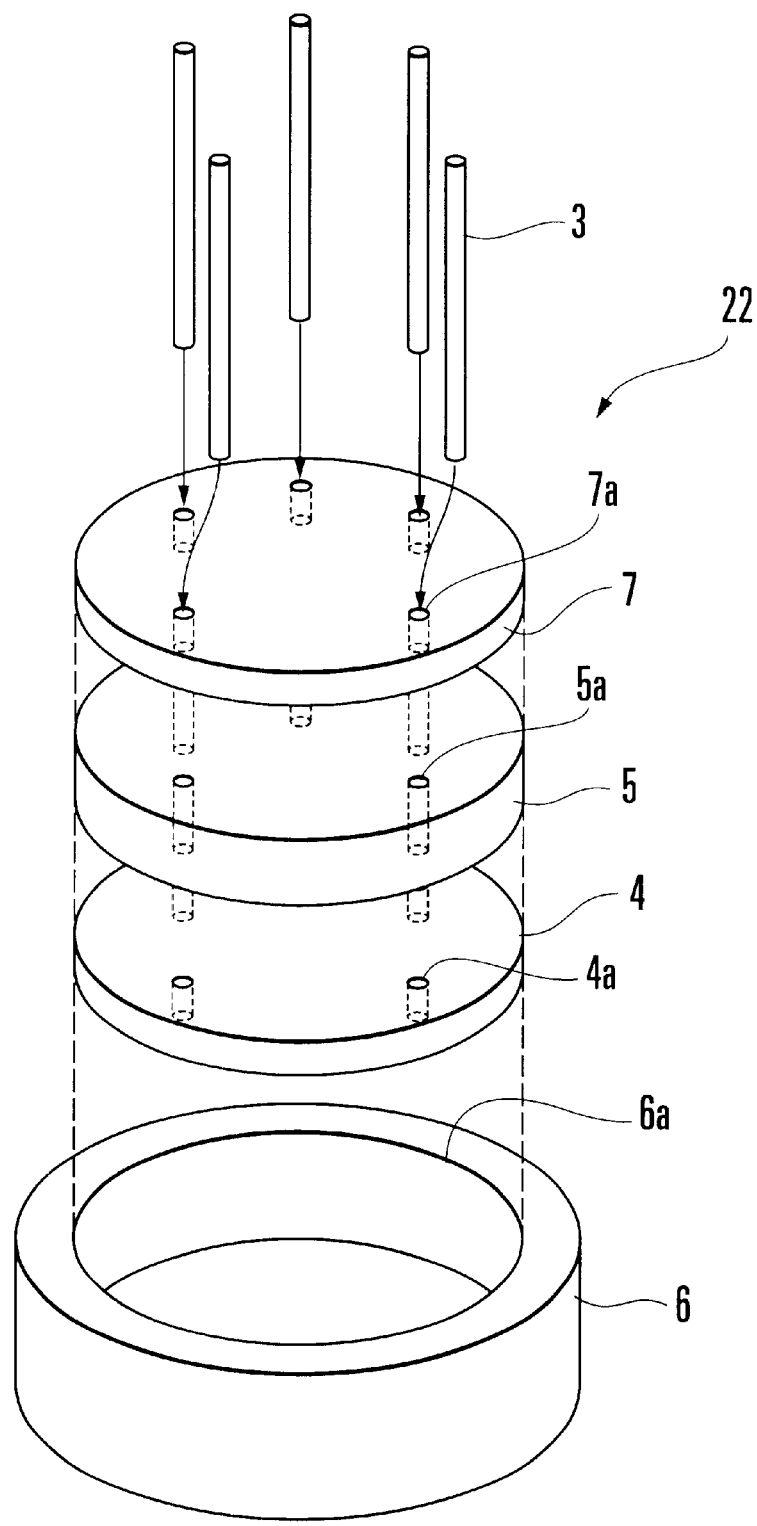
FIG. 7 is an exploded perspective view for explaining a method of manufacturing the base unit shown in FIG. 5.

As shown in FIG. 7, the electrode pins 3 are inserted in the through holes 7a from the lower side of the positioning glass member 7, and then in the through holes 5a and 4a of the positioning glass members 5 and 4. Subsequently, the hermetic seal glass member 5 sandwiched by the positioning glass members 4 and 7 is fitted on an inner surface 6a of the metal connector 6. In this manner, fabrication of the base unit 22 is completed. After that the pressure sensor is fabricated in the same manner as in the first embodiment.

According to the above embodiment, the bonding step required for fabricating the pressure sensor includes step 1: hermetically sealing the metal connector 6 and electrode pins 3 with glass and bonding the hermetic seal glass member 5 and positioning glass members 4 and 7 simultaneously, and step 2: bonding the sensor chip 1 (bonding the diced chip) and positioning glass member 4 by anodic bonding.

The number of steps can be reduced when compared to the prior art.

According to this embodiment, since the hermetic seal glass member 5 is sandwiched by the two positioning glass members 4 and 7, the number of portions that support the electrode pins 3 at a predetermined pitch increases, and the positioning precision becomes better than that in the structure of FIG. 1. A flat state where a fillet shape will not form can be maintained on both sides of the base unit 22, so that the pressure sensor can be built in an external unit more easily.

[Third Embodiment]

Figure 8A:
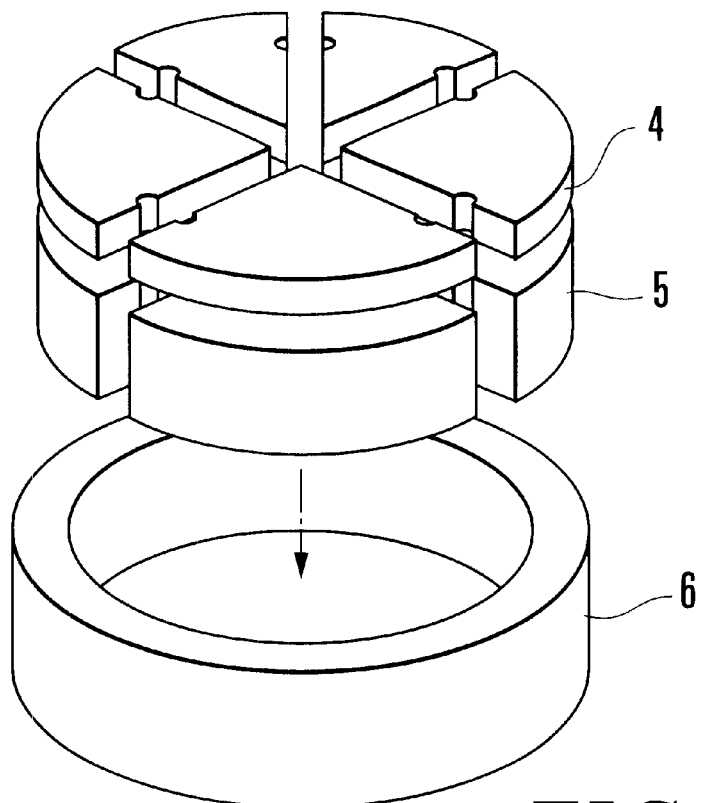
FIGS. 8A and 8B are perspective views of the main part of a pressure sensor according to the third embodiment of the present invention.
Figure 8B:
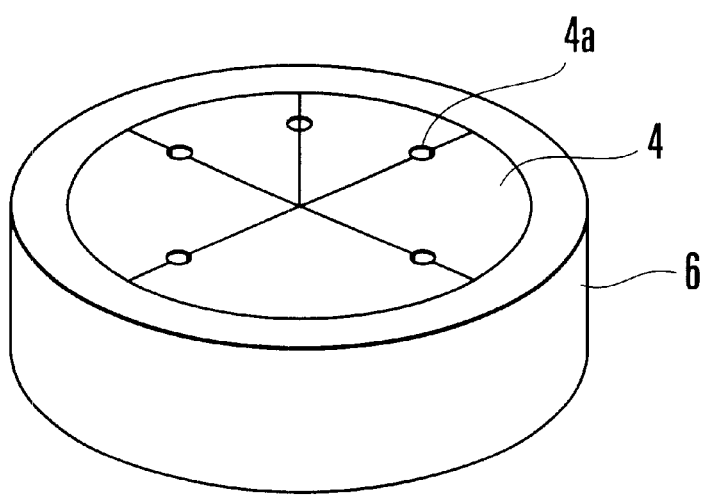

FIGS. 8A and 8B show the main part of a pressure sensor according to the third embodiment of the present invention.

As shown in FIG. 8A, each of a positioning glass member 4 and hermetic seal glass member 5 is formed by a plurality of plate members with fan shapes divided in the planar direction (to be referred to as fan-like members hereinafter), so holes need not be formed in forming glass members. In this case, semicircular notches are formed at predetermined positions of the fan-like members so that, when two adjacent fan-like members are brought into tight contact with each other, they form through holes 4a and 5a at their boundaries.

In this manner, when each of the positioning glass member 4 and hermetic seal glass member 5 is formed by the plurality of fan-like members, the hermetic seal glass member 5 softened by heating enters the gaps between the fan-like members of the positioning glass member 4, to hermetically seal electrode pins 3 and bond the fan-like members simultaneously. In this embodiment, the positioning glass member 4 and hermetic seal glass member 5 are fitted in a metal connector 6, and after that the electrode pins 3 are inserted in the through holes 4a and 5a.

According to this embodiment, the positioning glass member 4 and hermetic seal glass member 5 need not be subjected to hole formation which is expensive, thus effectively decreasing the manufacturing cost.

[Fourth Embodiment]

Figure 9:
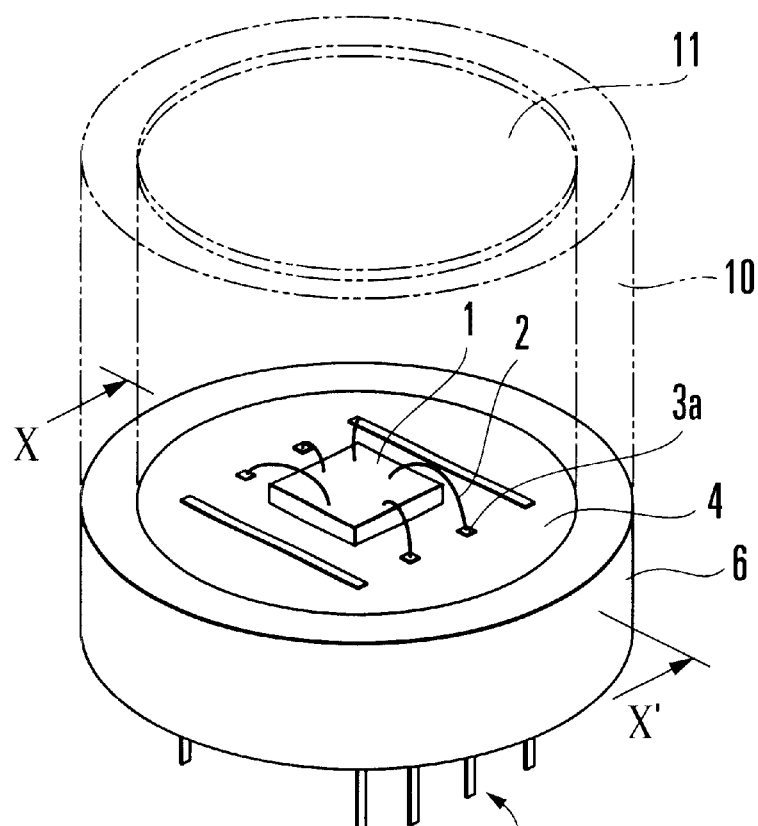
FIG. 9 is a perspective view of a pressure sensor according to the fourth embodiment of the present invention.

FIG. 9 shows a pressure sensor according to the fourth embodiment of the present invention.

Figure 10:
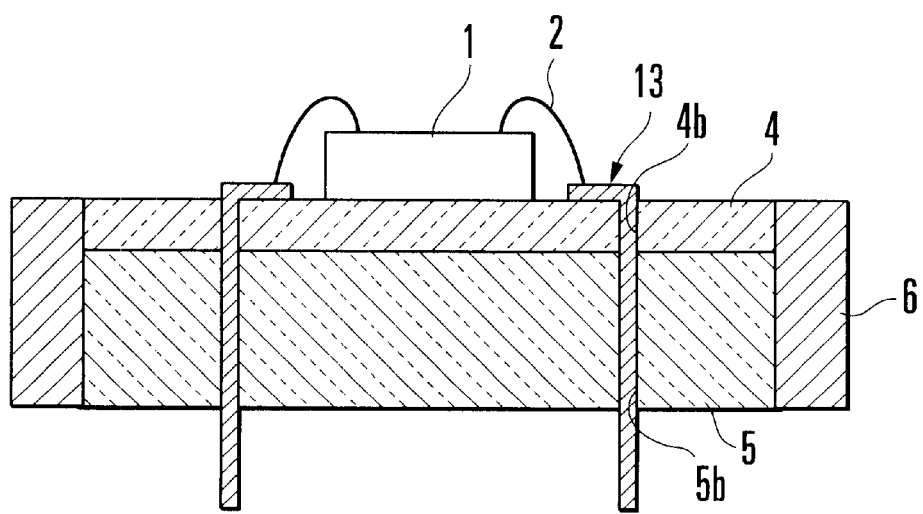
FIG. 10 is a sectional view taken along the line X–X' of FIG. 9.

In this embodiment, a lead frame 13 made of a conductive metal is used in place of the electrode pins 3 of FIG. 1. Distal end portions 13a of the lead frame 13 and the electrode pads (not shown) of a sensor chip 1 are connected to each other by bonding wires 2. As shown in FIG. 10, the lead frame 13 is comprised of a pair of opposing comb members each obtained by pressing and bending a metal plate, and are inserted in slits 4b and 5b formed in a positioning glass member 4 and hermetic seal glass member 5.

The slits 4b and 5b of the positioning glass member 4 and hermetic seal glass member 5 have widths almost equal to the thickness of the lead frame 13. The gaps between the lead frame 13 and the inner walls of the slits 4b of the positioning glass member 4 are hermetically sealed with the hermetic seal glass member 5 which is softened (or fluidized) and solidifies.

A method of manufacturing the pressure sensor having the above arrangement will be described with reference to FIG. 11.

Figure 11:
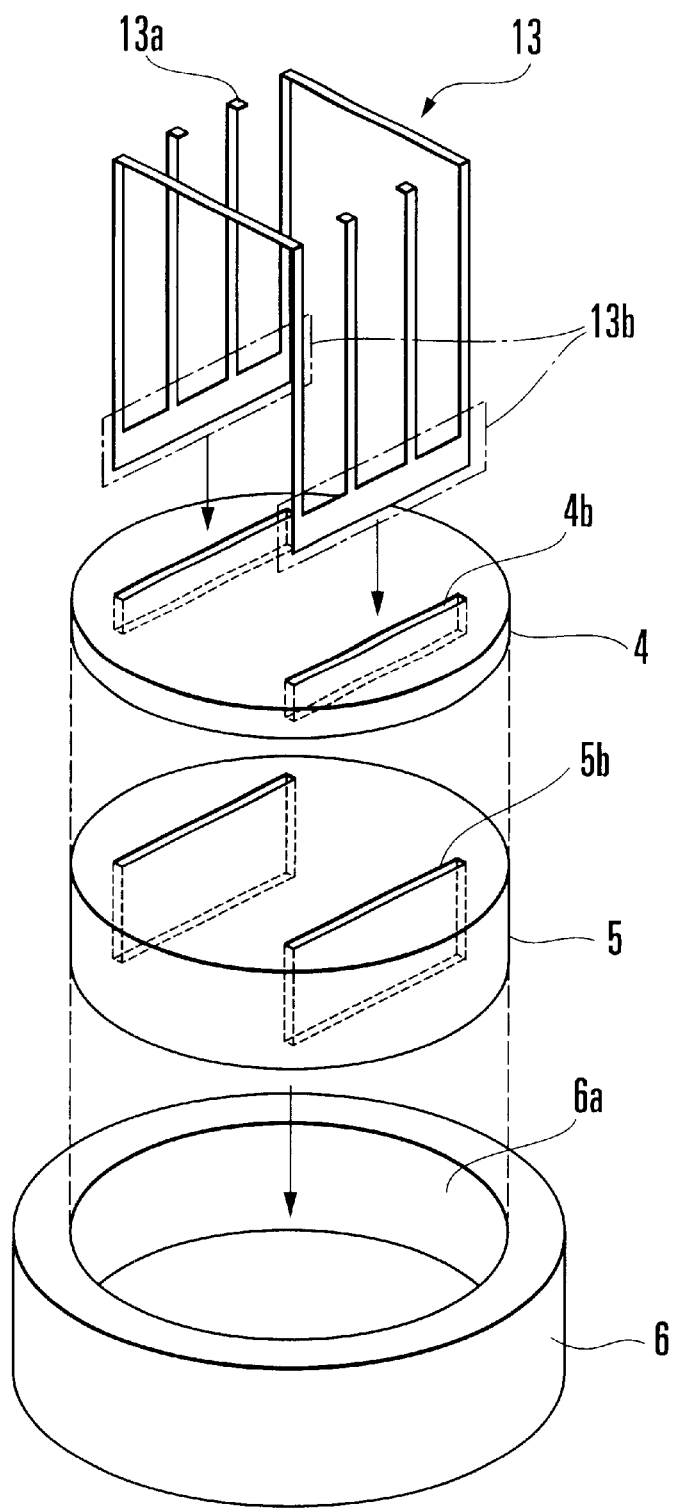
FIG. 11 is an exploded perspective view for explaining a method of manufacturing the base unit shown in FIG. 9.
Figure 12:
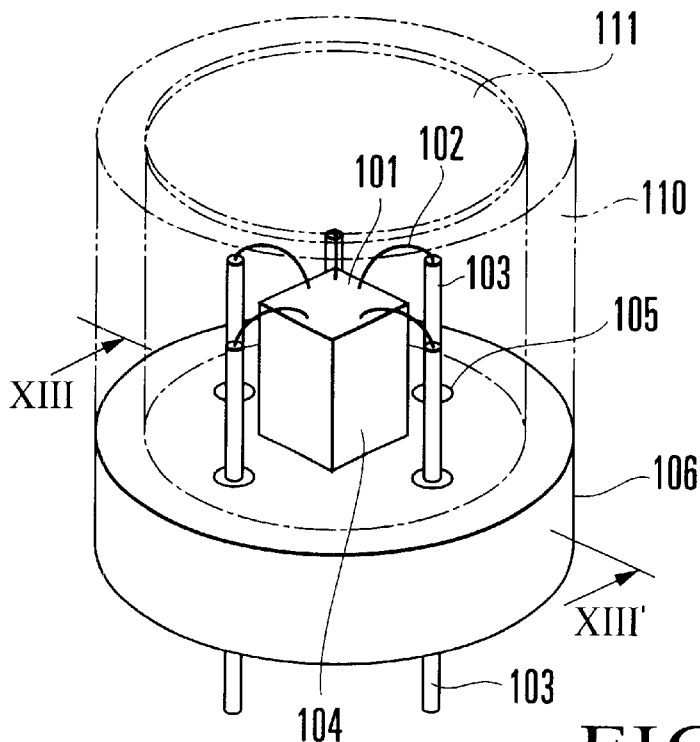
FIG. 12 is a perspective view of a conventional pressure sensor.
Figure 13:
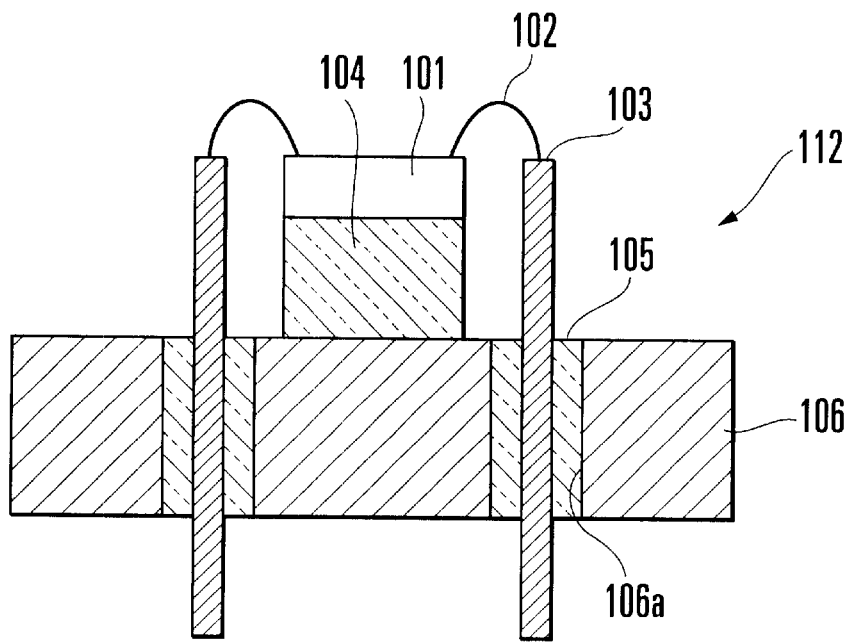
FIG. 13 is a sectional view taken along the line XIII–XIII' of FIG. 12.
Figure 14:
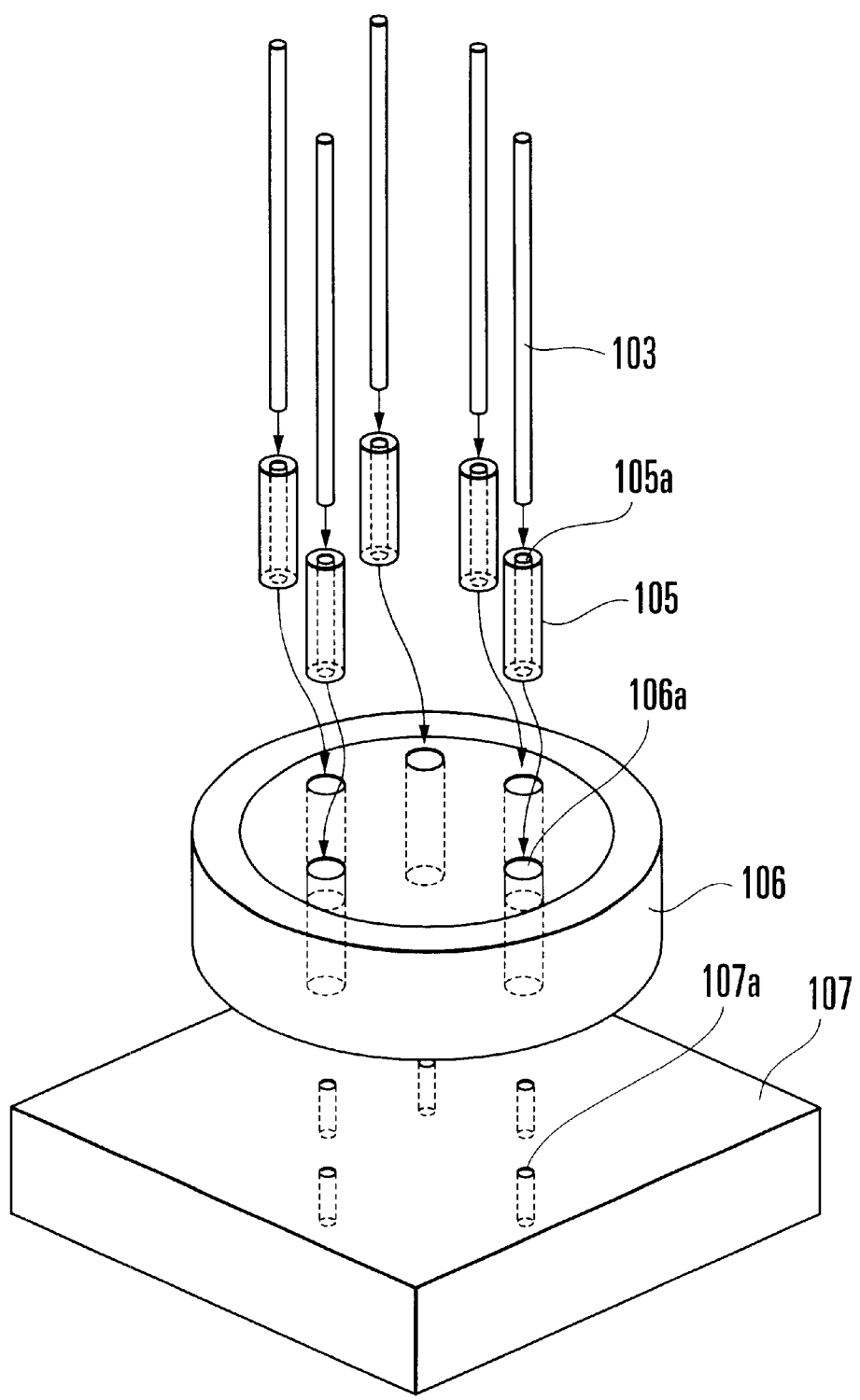
FIG. 14 is an exploded perspective view for explaining a method of manufacturing the base unit shown in FIG. 12.

As shown in FIG. 11, proximal end portions 13b of the lead frame 13 are inserted in the slits 4b from the upper side of the positioning glass member 4, and then in the slits 5b of the hermetic seal glass member 5. The positioning glass member 4 and hermetic seal glass member 5 with the inserted lead frame 13 are fitted on an inner surface 6a of a metal connector 6. The proximal end portions 13b of the lead frame 13 are cut off to leave only the distal end portions 13a in the base unit as electrode leads.

According to this embodiment, since the lead frame 13 is used in place of the electrode pins 3, when assembling the base unit, a plurality of electrode leads can be formed at once, thus simplifying the assembling process.

As the material of the positioning glass member in the first to fourth embodiments, glass containing $SiO_2$ as the main component and added with PbO, ZnO, $B_2O_3$, $Al_2O_3$, $Na_2O$, BaO, CaO, or KO, or glass containing only $SiO_2$ may be used. A ceramic material may be used in place of glass. In this case, an alumina-, titania-, SiC-, $Si_3N_4$-, or zircona-based ceramic material may be used.

As the material of the hermetic, glass member, glass (containing $SiO_2$ as the main component and added with PbO, ZnO, $B_2O_3$, $Al_2O_3$, $Na_2O$, BaO, CaO, or KO) similar to that of the material of the positioning glass member may be used. In this case, the amount of the additive must be adjusted so the hermetic glass member has a lower melting point than that of the positioning glass member.

As has been described above, according to the present invention, no buffer members need be formed between the sensor chip and base unit, and the number of manufacturing steps (particularly the bonding step) and the number of components can be decreased. As the buffer member is not necessary and the internal volume of the pressure sensor is small, the amount of sealed oil decreases. Since the electrode pins and lead frame are positioned by a positioning member, a high-precision positioning jig need not be prepared.

Since the sensor chip is mounted on the positioning member, the hermetic seal member does not come into direct contact with the sensor chip, so degradation of the p-n junction can be prevented. Since the positioning member is used, formation of a fillet shape in the pressure sensor can be prevented, making it easy to set a sealed oil decreasing member in the pressure sensor.

When the through holes for inserting the electrode pins and lead frame are to be formed in the same manner as in the prior art, hole formation by means of pressing or cutting is unnecessary, so that the degree of freedom in positioning the electrode pins can be increased. Naturally, a multi-pin structure can be fabricated easily.

What is claimed is:

1. A pressure sensor comprising:

a base unit on which a sensor chip is mounted;

a cap-like metal container which is fixed to said base unit so as to seal said sensor chip and in which oil is sealed; and a flexible diaphragm forming part of said metal container to transmit an external pressure by displacement thereof to said sensor chip through said oil, said base unit having a metal cylindrical member, a first positioning member fitted on an inner side of said cylindrical member and made of an insulating material, a lead member supported to extend through said first positioning member and electrically connected to said sensor chip through a bonding wire, and a hermetic seal layer formed on said first positioning member fitted in said cylindrical member to hermetically seal a portion between said cylindrical member and said first positioning member and a portion between said lead member and said first positioning member, said hermetic seal layer being made of an insulating material which is softened at a temperature lower than that of said positioning member.

2. A sensor according to claim 1, wherein said hermetic seal layer is softened and thereafter solidifies to hermetically seal a portion between an inner surface of said cylindrical member and an outer surface of said first positioning member and a portion between an outer surface of said lead member and said first positioning member.

3. A sensor according to claim 1, wherein said positioning member is made of either one of low-alkali glass and non-alkali glass, and said hermetic seal layer is made of soda-lime glass.

4. A sensor according to claim 1, wherein said hermetic seal layer is made of a glass material containing $SiO_2$ at least as a main component and added with one selected from the group consisting of PbO, ZnO, $B_2O_3$, $Al_2O_3$, $Na_2O$, BaO, CaO, and KO, and said glass material of said hermetic seal layer has a melting point lower than that of said positioning member.

5. A sensor according to claim 4, wherein said positioning member is made of a glass material containing $SiO_2$ at least as a main component and added with one selected from the group consisting of PbO, ZnO, $B_2O_3$, $Al_2O_3$, $Na_2O$, BaO, CaO, and KO.

6. A sensor according to claim 4, wherein said positioning member is made of a ceramic material selected from the group consisting of alumina-, titania-, SiC-, $Si_3N_4$-, and zirconia-based ceramic materials.

7. A sensor according to claim 1, wherein said sensor further comprises a second positioning member formed on said first positioning member through said hermetic seal layer, and said hermetic seal layer hermetically seals a portion between said cylindrical member and said second positioning member, and a portion between said lead member and said second positioning member.

8. A sensor according to claim 1, wherein said lead member is formed of a lead frame.

9. A sensor according to claim 1, wherein said first positioning member has a plurality of through holes through each of which said lead member extends in a direction of thickness, and said hermetic seal layer hermetically seals a gap between an outer surface of said lead member and an inner surface of each of said through holes formed in said first positioning member.

10. A sensor according to claim 9, wherein said first positioning member is constituted by a plurality of plate-like members divided in a planar direction, and said through holes are formed at a boundary of adjacent ones of said plate-like members.

* * * * *